(12) United States Patent
Delker

(10) Patent No.: US 10,764,378 B1
(45) Date of Patent: *Sep. 1, 2020

(54) MOBILE COMMUNICATION DEVICE SELF-LOCATING FRAMEWORK

(71) Applicant: Sprint Communications Company L.P., Overland Park, KS (US)

(72) Inventor: Jason R. Delker, Olathe, KS (US)

(73) Assignee: Sprint Communcations Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,782

(22) Filed: Jun. 20, 2019

Related U.S. Application Data (62) Division of application No. 15/724,250, filed on Oct. 3, 2017, now Pat. No. 10,382,571.

(51) Int. Cl.
| | | |
|---|---|---|
| *H04W 4/00* | (2018.01) | |
| *H04L 29/08* | (2006.01) | |
| *G01S 5/00* | (2006.01) | |
| *H04W 88/06* | (2009.01) | |
| *H04W 4/02* | (2018.01) | |
| *G01S 5/02* | (2010.01) | |
| *G01S 19/42* | (2010.01) | |
| *H04M 1/725* | (2006.01) | |

(52) U.S. Cl.
CPC .......... *H04L 67/18* (2013.01); *G01S 5/0009* (2013.01); *G01S 5/0252* (2013.01); *H04W 4/025* (2013.01); *H04W 88/06* (2013.01); *G01S 19/42* (2013.01); *H04M 1/72572* (2013.01)

(58) Field of Classification Search
CPC ........ H04W 4/02; H04W 64/00; H04W 88/06
See application file for complete search history.

(56) References Cited

U.S. PATENT DOCUMENTS

| | | | |
|---|---|---|---|
| 9,628,359 B1 * | 4/2017 | Jain | ..................... H04L 43/0811 |
| 9,661,600 B2 | 5/2017 | Jeong | |
| 10,382,571 B1 | 8/2019 | Delker | |
| 2008/0026773 A1 | 1/2008 | Hyun et al. | |
| 2015/0215890 A1 * | 7/2015 | Nagatomo | ............ H04W 64/00 455/456.1 |
| 2017/0039242 A1 * | 2/2017 | Milton | ............... G06Q 30/0269 |

OTHER PUBLICATIONS

Notice of Allowance dated Apr. 17, 2019, U.S. Appl. No. 15/724,250, filed Oct. 3, 2017.

* cited by examiner

*Primary Examiner* — Omoniyi Obayanju (57) ABSTRACT

A mobile communication device. The device comprises a cellular radio transceiver, a GPS receiver, a processor, a memory, and a self-locating application stored in the memory. When executed by the processor the application monitors a received signal strength of the radio transceiver, in response to detecting a rate of cellular radio signal strength increase above a first threshold, obtains GPS coordinates of the device from the GPS receiver and an identity of a serving cell site, stores the GPS coordinates with the identity of the serving cell site in the memory, and in response to detecting a rate of cellular radio signal strength decrease below a second predefined threshold and determining that the cellular radio transceiver is served by the serving cell site associated with the GPS coordinates stored in the memory, determines that the device is at the location associated with the GPS coordinates stored in the memory.

16 Claims, 7 Drawing Sheets

MOBILE COMMUNICATION DEVICE SELF-LOCATING FRAMEWORK

CROSS-REFERENCE TO RELATED APPLICATIONS

This application is a divisional of and claims priority under 35 U.S.C. § 120 to U.S. application Ser. No. 15/724,250, filed Oct. 3, 2017 and entitled "Mobile Communication Device Self-Locating Framework," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are widely used by individuals to obtain nearly ubiquitous communication connectivity and to perform a variety of different communication activities. Devices can be used to place voice calls, browse the Internet, complete on-line purchase transactions, manage financial accounts, engage in social networking, and other activities. Devices may have cellular radio transceivers for establishing wireless links with a cellular network. Devices may further have WiFi radio transceivers for establishing wireless links to WiFi access points (APs) that can communicatively couple the devices to the Internet without going through the cellular radio access network (RAN) and possibly avoiding data tonnage charges.

SUMMARY

In an embodiment, a mobile communication device is disclosed. The mobile communication device comprises a cellular radio transceiver, a WiFi radio transceiver, a global positioning system (GPS) receiver, a processor, a non-transitory memory, and a self-locating application stored in the non-transitory memory. When executed by the processor, the application monitors a received signal strength parameter of the cellular radio transceiver, in response to detecting a rate of cellular radio signal strength increase above a first predefined threshold, obtains GPS coordinates representing a location of the mobile communication device from the GPS receiver and an identity of a serving cell site, and stores the GPS coordinates with the identity of the serving cell site in the non-transitory memory. The application further monitors a plurality of WiFi service set identifiers (SSIDs) received by the WiFi radio transceiver, in response to detecting a loss of the WiFi SSIDs, obtains second GPS coordinates of the mobile communication device from the GPS receiver, and stores the second GPS coordinates with the plurality of WiFi SSIDs in the non-transitory memory. The application further, in response to detecting a rate of cellular radio signal strength decrease below a second predefined threshold and determining that the cellular radio transceiver is served by the serving cell site associated with the GPS coordinates stored in the non-transitory memory, determines that the mobile communication device is at the location associated with the GPS coordinates stored in the non-transitory memory in association with the identity of the serving cell site, and in response to detecting the WiFi SSIDs, determines that the mobile communication device is at the location associated with the second GPS coordinates stored in the non-transitory memory in association with the WiFi SSIDs. The application further, based on the determination of the location of the mobile communication device, launches a mobile application on the mobile communication device.

In another embodiment, a mobile communication device is disclosed. The mobile communication device comprises a cellular radio transceiver, a global positioning system (GPS) receiver, a processor, a non-transitory memory, and a self-locating application stored in the non-transitory memory. When executed by the processor, the application monitors a received signal strength parameter of the cellular radio transceiver, in response to detecting a rate of cellular radio signal strength increase above a first predefined threshold, obtains GPS coordinates representing a location of the mobile communication device from the GPS receiver and an identity of a serving cell site, stores the GPS coordinates with the identity of the serving cell site in the non-transitory memory, and, in response to detecting a rate of cellular radio signal strength decrease below a second predefined threshold and determining that the cellular radio transceiver is served by the serving cell site associated with the GPS coordinates stored in the non-transitory memory, determines that the mobile communication device is at the location associated with the GPS coordinates stored in the non-transitory memory in association with the identity of the serving cell site.

In yet another embodiment, a mobile communication device is disclosed. The mobile communication device comprises a WiFi radio transceiver, a global positioning system (GPS) receiver, a processor, a non-transitory memory, and a self-locating application stored in the non-transitory memory. When executed by the processor, the application monitors a plurality of WiFi service set identifiers (SSIDs) received by the WiFi radio transceiver, in response to detecting a loss of the WiFi SSIDs, obtains GPS coordinates representing a location of the mobile communication device from the GPS receiver, stores the GPS coordinates with the plurality of WiFi SSIDs in the non-transitory memory, and in response to detecting the WiFi SSIDs, determining that the mobile communication device is at the location associated with the GPS coordinates stored in the non-transitory memory in association with the WiFi SSIDs.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Knowing the location of a mobile communication device can provide valuable information. This location information can be used in a wide variety of ways, including statistical monitoring of traffic flows of device users, real-time notification of specific users, and targeted advertising. This location information can help retail outlets understand their foot traffic. This location information can help highway managers to understand traffic flows to manage traffic light timings and project future road needs. Having said this, obtaining precise location information of mobile communication devices poses various challenges.

For example, it may be difficult for a server computer operating in a wireless communication service provider's network to timely determine a position of a mobile communication device. For example, requesting the mobile communication device to do a GPS position determination and send GPS latitude-longitude information back to the central server may require user approval which may not be available for one reason or another (e.g., user is driving a vehicle and not monitoring the interface of his or her device, the request is blocked by another mobile application executing on the device such as a game or web browser). Trilateration techniques may be both computationally intensive and inaccurate. Part of the challenge is related to the scale of the centralized servers monitoring the locations of wireless communication devices continuously in real-time, where as many as 50 million devices may be served by a wireless communication service provider. Additionally, in some scenarios the mobile communication devices are unable to determine their precise position because the device is inside a building and the GPS receiver may then be unable to determine a position because the radio signals from the GPS satellites may be blocked by the structures of the building.

The present disclosure teaches a system and method for determining a location by a mobile communication device by itself. This may be referred to as self-locating by the device and may be provided by a self-locating framework or self-locating application installed on the device. A variety of self-location techniques will be described independently, but it is understood that the self-location techniques may be employed collaboratively to corroborate a self-location determination.

The self-locating application may monitor a cellular radio signal strength of a cellular radio of the mobile communication device. When the cellular radio signal strength increases rapidly, this may be the result of the device leaving a building and going outside. When this triggering event occurs, the self-locating application requests the current latitude and longitude of the device from a GPS receiver of the device. The self-locating application also determines an identity of the serving cell site. The self-locating application then stores an entry in a memory of the device which associates the latitude-longitude of the present device position to the identity of the serving cell site. At a future time, when the self-locating application determines that the cellular radio strength decreases rapidly, this may be the result of the device entering a building and going inside where GPS signals are unavailable. When this triggering event occurs, the self-locating application can determine what the most recent serving cell site identity was, use this serving cell site identity as a key to search entries in the memory, and find a latitude-longitude associated to the serving cell site identity. The self-locating application then infers that the subject latitude-longitude coordinates that were looked up give the current location of the device.

This current location information may be used for various purposes, such as building profiles associated with a user of the mobile communication device, launching a mobile application on the device associated with the location (e.g., the inferred location may be the location of a coffee shop and a mobile application associated with the subject coffee shop may be launched on the device, the inferred location may be the location of a hardware retail store and a mobile application associated with the hardware retail store may be launched on the device, the inferred location may be the location of a grocery store and a mobile application associated with the grocery store may be launched on the device, or the inferred location may be the location of a department store and a mobile application associated with the department store may be launched on the device), or targeting mobile advertisements to the device based on the inferred location. The current location information may be used by the device to provide access keys to one of the identified WiFi access points and automatically offloading communication traffic from a cellular link to the WiFi access point, thereby sparing a limited data consumption of the device. The current location information may be used by the device to deliver a notification on the device. This notification could have been previously stored on the device and linked to the subject location. By delaying presentation of the notification until the device was at the subject location, the notification may have more impact and may spare the user from useless information clutter when the notification may to no purpose.

The self-locating application monitors radio signals of WiFi access points (APs). Said in another way, the self-locating application monitors available service set identifiers (SSIDs) of WiFi APs that are in communication with a WiFi radio transceiver of the mobile communication device. When all or a majority of the monitored SSIDs go away, this may be the result of the mobile communication device leaving a building where the WiFI APs associated with the monitored SSIDs are located. When this triggering event occurs, the self-locating application requests the current latitude and longitude of the device from a GPS receiver of the device. The self-locating application then stores an entry in a memory of the device which associates the latitude-longitude of the present device position to the identities of the WiFi SSIDs that suddenly went away. At a future time, when the self-locating application determines that the set of WiFi SSIDs reappear, this may be the result of the device entering a building and going inside where GPS signals are unavailable. When this triggering event occurs, the self-locating application can use the set of WiFi SSIDs as a key to search entries in the memory and find a latitude-longitude associated to those WiFi SSIDs. The self-locating application then infers that the subject latitude-longitude coordinates that were looked up give the current location of the device.

It will be appreciated that in some circumstances these two separate self-locating techniques can be used to corroborate each other and increase confidence in the self-location determination. On the other hand, in some circumstances the cellular radio signal strength self-locating technique may work while the WiFi SSID self-locating technique does not work. Likewise, in some circumstances the WiFi SSID self-locating technique works but the cellular radio signal strength self-locating technique does not work. Thus, a self-locating application that attempts to use both techniques may be able to increase the number of circumstances in which it can accurately infer the position of the mobile communication device.

The self-locating application may analyze the consistency of the latitude-longitude determinations with the subject triggering events. This may lead to assigning confidence metrics to the entry in the memory associating the location of the device to the triggering event (e.g., to a specific cell site identity or to a plurality of WiFi SSIDs). As confidence in such associations grows to exceed a predefined confidence threshold, the self-locating application may transmit the association to a server in the network that stores this association in a data store of location inference associations. The server may receive consistent location inference associations from a plurality of mobile communication devices and thereby assign increased confidence to these location inference associations. As the server's assigned confidence exceeds a predefined server confidence threshold, the server may transmit selected ones of the location inference associations to mobile communication devices.

The server may transmit location inference associations related to a delimited area to mobile communication devices that are known to operate in the delimited area. For example, the server may send location inference associations related to the Kansas City area to self-locating applications executing on mobile communication devices known to operate in the Kansas City area. Alternatively, the server may make those location inference associations (i.e., those it has established confidence in) available to mobile communication devices that invoke an application programming interface (API) of the server to request some of the location inference associations be transmitted to them. The mobile communication devices may provide a regional criteria when invoking the API of the server, defining an area for which inference associations are requested, thereby reducing the communication burden of transmitting the location inference associations. This delimiting of the location inference associations that are requested also conserves the memory of the mobile communication device.

The self-locating application may determine when a received location inference association is already stored locally and disregard or discard the received location inference association. In another circumstance, if the self-locating application does not find a similar location inference association stored locally, it will add the location inference association to its memory. In this way, self-locating information learned by different devices may be shared by a larger community of mobile communication devices improving the self-locating capabilities of the community of mobile communication devices. These devices, the self-locating application installed on those devices, and the central server and data store may be referred to as a self-locating framework.

Figure 1:
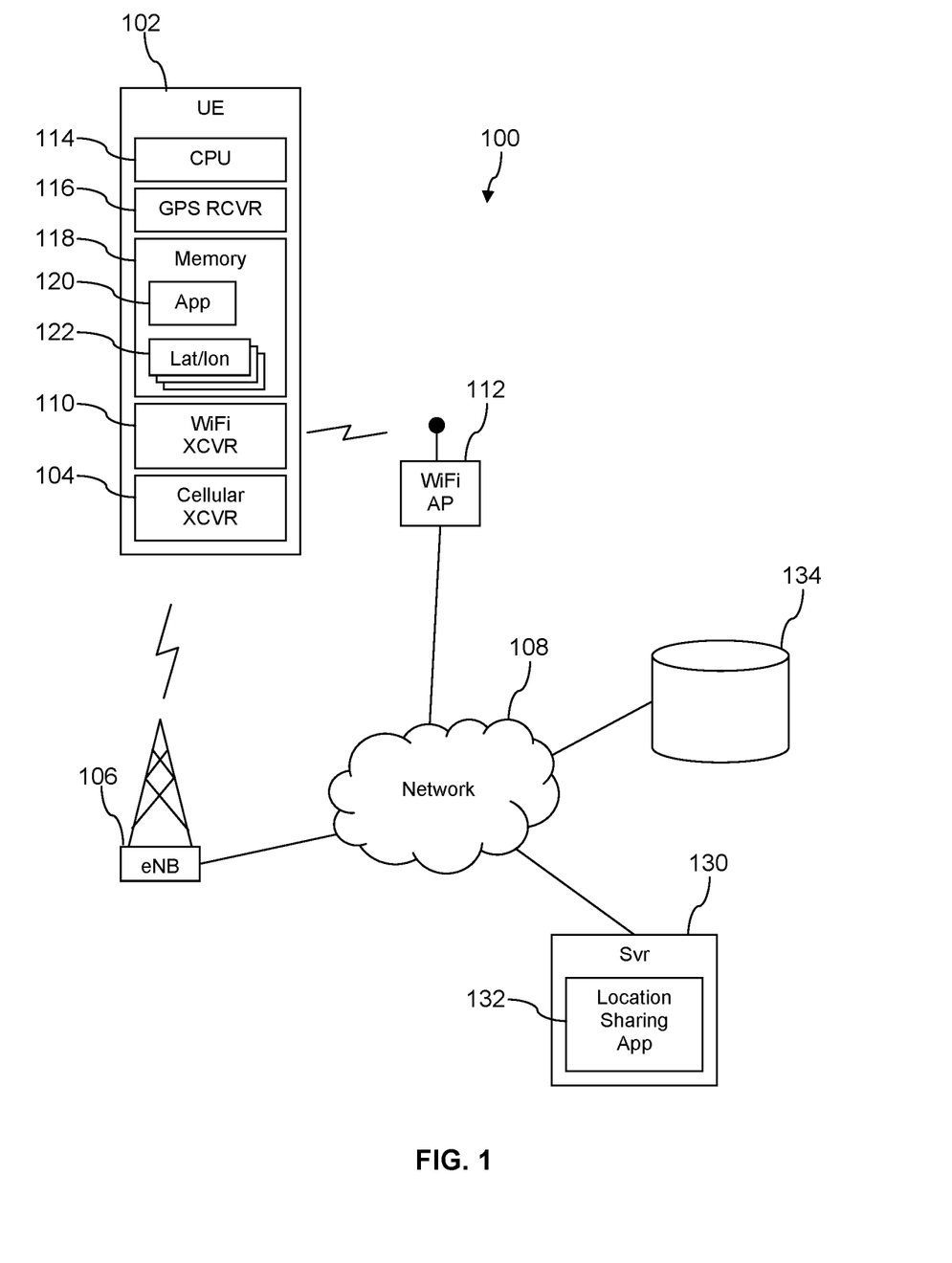
FIG. 1 is a block diagram of a communication system according to an embodiment of the disclosure.

Turning now to FIG. 1, a communication system 100 is described. In an embodiment, the system 100 comprises a mobile communication device (user equipment—UE) 102 comprising a cellular radio transceiver 104 and a WiFi radio transceiver 110, a cell site 106, a network 108, and a WiFi access point (AP) 112. It is understood that the system 100 may comprise any number of mobile communication devices 102, any number of cell sites 106, and any number of WiFi APs 112.

The device 102 may be a mobile phone, a smart phone, a personal digital assistant (PDA), a wearable computer, a headset computer, a laptop computer, a tablet computer, or a notebook computer. The cell site 106 may provide a wireless communication link to the mobile communication device 102 according to one of a long term evolution (LTE), a code division multiple access (CDMA), a global system for mobile communication (GSM), a worldwide interoperability for microwave access (WiMAX) wireless communication protocol. When the cell site 106 provides a wireless communication link to the device 102 it may communicatively couple the device 102 to the network 108 whereby the device 102 is able to conduct voice communication or data communication. When the WiFi AP provides a wireless communication link to the device 102 it may communicatively couple the device 102 to the network 108 to conduct communication. The network 108 may be one or more private networks, one or more public networks, or a combination thereof.

The mobile communication device 102 further comprises a processor 114, a global positioning system (GPS) receiver 116, and a memory 118. The memory 118 may comprise a transitory memory portion and a non-transitory memory portion. The non-transitory portion of the memory 118 stores a self-locating application 120 and one or more self-locating entries 122. Some self-locating entries 122 may comprise a latitude-longitude coordinate pair (i.e., GPS coordinates) associated with an identity of a cell site. Other self-locating entries 122 may comprise a latitude-longitude coordinate pair (i.e., GPS coordinates) associated with one or more service set identifiers (SSIDs). A WiFi AP 112 may be identified by an SSID. In an embodiment, the self-locating entries 122 are a mixture of entries such that some entries 122 contain an identity of a cell site and other entries 122 contain one or more SSID.

The self-locating application 120 may be installed as a native application by the original equipment manufacturer (OEM) and have access to low-level operating system commands. Alternatively, the self-locating application 120 may be downloaded as a user installed mobile application. Alternatively, the self-locating application 120 may be built into a mobile application (e.g., a free gaming application, a social network application, or other third party mobile application) by a software development kit (SDK) that was used to build the mobile application initially. The self-locating application 120 monitors the received radio signal strength determined by the cellular radio transceiver 104. The self-locating application 120 also monitors the available WiFi APs 112, for example monitoring SSIDs that are available to the WiFi radio transceiver.

In an embodiment, the self-locating application 120 may keep a store of values of cellular received radio signal strength at different times, for example a store of 5 values of cellular received radio signal strength, a store of 10 values of cellular received radio strength, a store of 15 values of cellular received radio signal strength, or some other number of stored values of cellular received radio signal strength. These stored values may be the values determined over the most recent periods of time (e.g., the most recent 5 values, the most recent 10 values, the most recent 15 values of cellular received radio signal strength). Values that are old may be overwritten by new values. For example, the $16^{th}$ most recent value may have been overwritten by the $1^{st}$ most recent value; the $17^{th}$ most recent value may have been overwritten by the $2^{nd}$ most recent value of cellular received radio signal strength.

The self-locating application 120 may determine the cellular received radio signal strength periodically, for example every 5 seconds, every 10 seconds, every 15 seconds, every 20 seconds, or some other periodic interval. When the cellular radio transceiver 104 detaches from one serving cell site 106 and attaches to a different serving cell site 106, the existing store of cellular received radio signal strength values may be flushed or deleted and a current cellular received radio signal strength determined and stored, aperiodically, without consideration of the periodic interval that was in progress.

The self-locating application 120 compares a newly determined value of cellular radio signal strength to one or more of the stored values of cellular radio signal strength and if the newly determined value of cellular radio signal strength is significantly greater than the compared stored values of cellular radio signal strength, that may be deemed a cellular signal strength change event. The cellular radio signal strength change event may correlate to the event of leaving a building. In response to the cellular signal strength change event, the self-locating application 120 requests a current location fix from the GPS receiver 116, for example requests a current latitude-longitude pair (i.e., GPS coordinates). Also in response to the cellular signal strength change event, the self-locating application 120 determines the identity of the current serving cell site 106. The self-locating application 120 creates a new entry 122 comprising the identity of the current serving cell site 106 and the current latitude-longitude pair (i.e., GPS coordinates).

In an embodiment, other methods of determining the cellular signal event may be employed. For example, rather than comparing only the newly determined value of cellular radio signal strength to one or more previous values, the self-locating application 120 may determine a rate of change of the cellular radio signal strength over a plurality of recent values cellular radio signal strength, including the newly determined value of cellular radio signal strength, and compare this rate of change of cellular radio signal strength to a predefined threshold rate of change of the cellular radio signal strength. If the observed rate of change is greater than the predefined threshold rate of change, a cellular signal strength change event is deemed to have occurred.

The self-locating application 120 may also keep a store of values of WiFi SSIDs available to or "visible to" the WiFi radio transceiver 110 at different times, for example a store of 5 values of available SSIDs, a store of 10 values of available SSIDs, a store of 15 values of available SSIDs, or some other number of stored values of available SSIDs. Each store of available WiFi SSIDs may store a plurality of different SSIDs. For example, a first store may store 4 different available WiFi SSIDs, a second store may store the same 4 available WiFi SSIDs, a third store may store the same 4 available WiFi SSIDs, a fourth store may store 5 available WiFi SSIDs. In each case, the store comprises a list of WiFi SSIDs that are available or "visible" at a point in time. The self-locating application 120 may determine the available SSIDs periodically, for example every 5 seconds, every 10 seconds, every 15 seconds, every 20 seconds, or some other periodic interval.

The self-locating application 120 compares a newly determined set of one or more available SSIDs to one or more previous sets of available SSIDs. When a significant decrease in available SSIDs occurs between the compared sets of available SSIDs, a WiFi SSID set change event is deemed to have occurred. The WiFi SSID set change event may correlate with the mobile communication device 102 leaving a building. For example, if the current set of available SSIDs drops to one SSID or zero SSIDs while the two or three previous sets of available SSIDs identified 6 SSIDs, this may be deemed a WiFi SSID set change event. In response to a WiFi SSID set change event, the self-locating application 120 requests a current location fix from the GPS receiver 116, for example requests a current latitude-longitude pair (i.e., GPS coordinates). Also in response to the WiFi SSID set change event, the self-locating application 120 looks up the set of available SSIDs identified prior to the WiFi SSID set change event. The self-locating application 120 creates a new entry 122 comprising the identities of the WiFi SSIDs available prior to the WiFi SSID set change event and comprising the current latitude-longitude pair (i.e., GPS coordinates).

The inverse of the cellular signal strength change event and the inverse of the WiFi SSID set change event may be used as proxies for the location of the mobile communication device 102. The usefulness of synthesizing this kind of location proxy is that the GPS receiver 116 may not provide accurate position information in the circumstances corresponding to these inverse change events, as the device 102 is likely inside a building. The inverse of the cellular signal strength change event may be a sudden decrease of cellular signal strength and the inverse of the WiFi SSID set change event may be a sudden reappearance of the set of WiFi SSIDs that had disappeared.

The self-locating application 120 monitors the cellular received radio signal strength and the set of available WiFI SSIDs and determines when an inverse change event occurs. When an inverse change event occurs, the self-locating application 120 searches the self-locating entries 122 for an entry 122 that matches either the last serving cell site identity or the current set of available WiFi SSIDs. In an embodiment, the match between the current set of available WiFi SSIDs and the set of WiFi SSIDs in an entry 122 need not be exact to be deemed a match. For example, if the set of WiFi SSIDs in an entry 122 comprises 60% or more of the WiFI SSIDs currently available, this may be deemed a match. If a match (either to a serving cell identity or to a set of WiFi SSIDs) is determined, the latitude-longitude pair stored in the matching entry 122 is inferred to be the present location of the mobile communication device 102. This inferred present location of the mobile communication device 102 may then be provided to other mobile applications on the device 102 or sent to a server in the network 108, for example to an advertising gateway or to servers associated with client mobile applications on the mobile communication device. The inferred present location of the mobile communication device 102 may be used to launch a mobile application on the mobile communication device, such as a coffee shop mobile application or a retail store mobile application.

In an embodiment, the self-locating application 120 may transmit self-locating entries 122 to a server computer 130 and a location sharing application 132 that executes on the server computer 130. The location sharing application 132 may store the received self-locating entries 122 in a location data store 134. These location entries stored in the location data store 134 may be referred to as shared location entries. The shared location entries, like the self-locating entries 122 they are based on, comprise a GPS coordinate pair. The self-locating application 120 may transmit all entries 122 periodically to the server computer 130, for example once per day, once per week, once per month, or on some other periodic interval. Alternatively, the self-locating application 120 may transmit only newly created entries 122 periodically to the server computer 130, for example entries 122 created since the previous transmission.

The server computer 130 and the location sharing application 132 may provide shared location entries to other mobile communication devices 102. In an embodiment, the location sharing application 132 may push shared location entries to participating devices 102. Alternatively, a mobile communication device 102 desiring access to shared location entries may invoke an application programming interface (API) of the location sharing application 132 to request the shared location entries. In an embodiment, the mobile communication device 102 may include an area designation in the request for shared location entries that constrains the shared location entries that are sent to it, for example, constrained to shared location entries having GPS coordinates that fall within the designated area. Shared location entries received by the mobile communication device 102 may be stored by the self-locating application 120 as entries 122 in the memory 118. The shared location entries may be stored in the same format as entries 122 created by the self-locating application 120 and may be used to self-locate by the self-locating application 120 in the same way that entries 122 created on-device are used to self-locate.

In an embodiment, the self-locating application 120 may develop confidence scores or metrics for one or more entries 122. For example, if the self-locating application 120 has experienced a cellular radio signal strength event associated with the same serving cell site and the same GPS coordinates several times, the confidence in this specific association of service cell site and GPS coordinate pair is higher than if the self-locating application 120 has experienced the cellular radio signal strength event associated with a serving cell site and a GPS coordinate pair once. The confidence score may be stored with each entry 122. In an embodiment, the self-locating application 120 may not share entries with the location sharing application 132 and the location data store 134 until the confidence score associated with an entry 122 achieves or exceeds a predefined threshold value. This may help to maintain the quality of shared location associations stored in the location data store 134 and shared to other mobile communication devices 102. In a like way, the location sharing application 132 may maintain a track of numbers of different mobile communication devices 102 that have shared the same GPS coordinate pair and serving cell site identity or GPS coordinate pair and WiFi SSIDs and establish a confidence metric for location associations stored in the data store 134. The location sharing application 132 may only transmit entries from the data store to requesting devices 102 when the subject entries in the data store 134 meet or exceed a predefined data store confidence score.

Figure 2A:
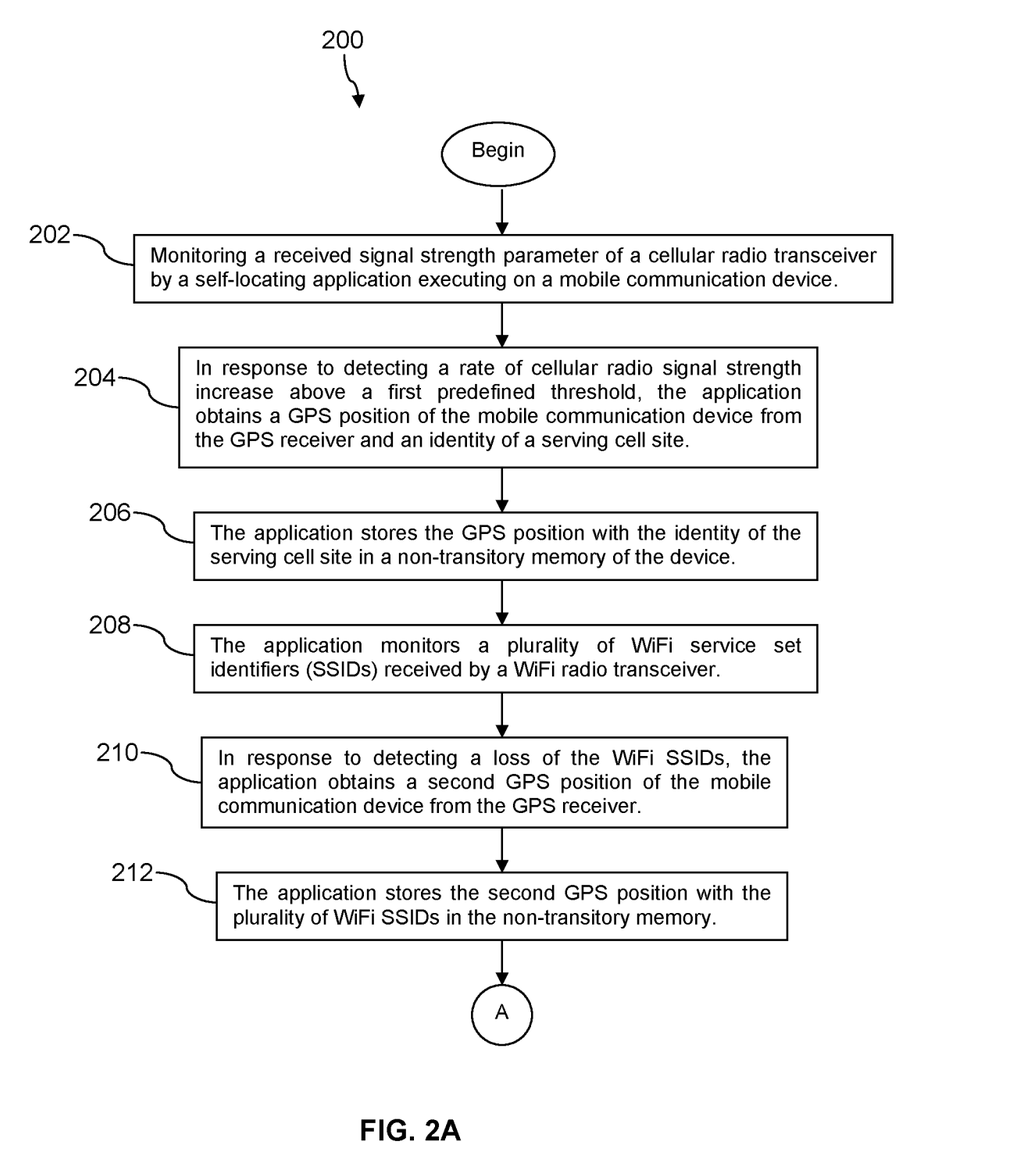
FIG. 2A and FIG. 2B is a flow chart of a method according to an embodiment of the disclosure.
Figure 2B:
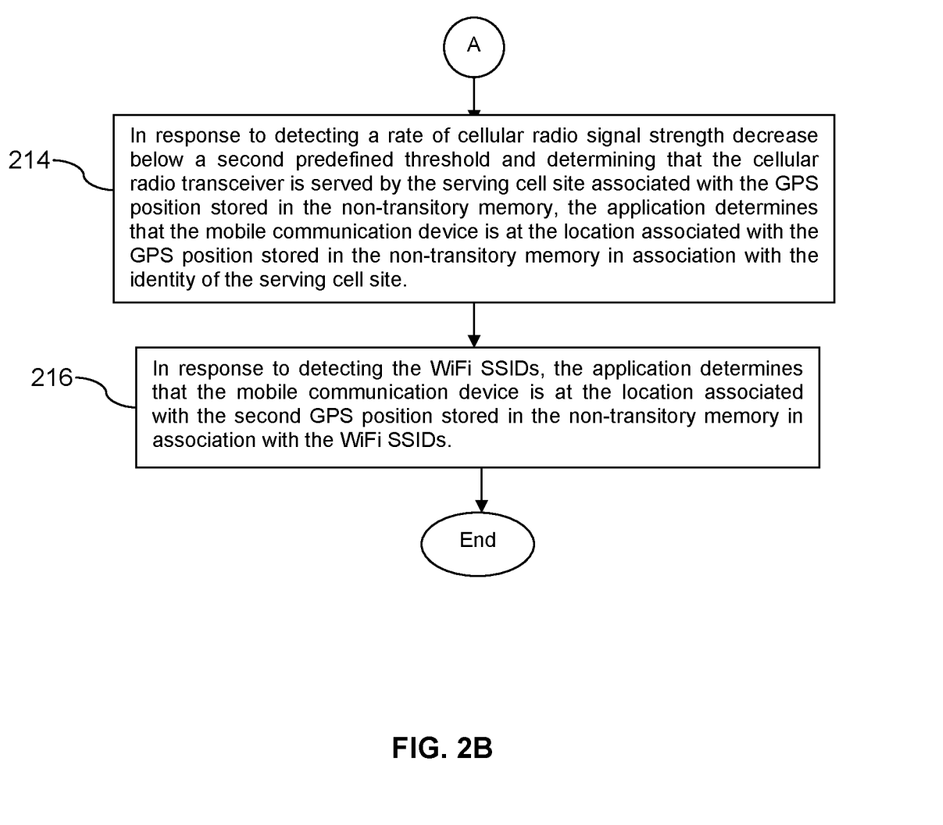

Turning now to FIG. 2A and FIG. 2B, a method 200 is described. The method 200 may be performed by the self-locating application 120. At block 202, a self-locating application (i.e., self-locating application 120) executing on a mobile communication device (i.e., mobile communication device 102) monitors a received signal strength parameter of a cellular radio transceiver. At block 204, in response to detecting a rate of cellular radio signal strength increase above a first predefined threshold, the application obtains a GPS position of the mobile communication device from the GPS receiver and an identity of a serving cell site. At block 206, the application stores the GPS position with the identity of the serving cell site in a non-transitory memory of the device.

At block 208, the application monitors a plurality of WiFi service set identifiers (SSIDs) received by a WiFi radio transceiver. At block 210, in response to detecting a loss of the WiFi SSIDs, the application obtains a second GPS position of the mobile communication device from the GPS receiver. At block 212, the application stores the second GPS position with the plurality of WiFi SSIDs in the non-transitory memory.

At block 214, in response to detecting a rate of cellular radio signal strength decrease below a second predefined threshold and determining that the cellular radio transceiver is served by the serving cell site associated with the GPS position stored in the non-transitory memory, the application determines that the mobile communication device is at the location associated with the GPS position stored in the non-transitory memory in association with the identity of the serving cell site. At block 216, in response to detecting the WiFi SSIDs, the application determines that the mobile communication device is at the location associated with the second GPS position stored in the non-transitory memory in association with the WiFi SSIDs.

In an embodiment, method 200 may further comprise the self-locating application 120 requesting associations of GPS coordinates and WiFi SSIDs from a server computer using an application programming interface (API) of the server computer; the self-locating application 120 receiving a plurality of associations of GPS coordinates and serving cell site identities and a plurality of associations of GPS coordinates and WiFi SSIDs from the server computer; and the self-locating application 120 storing the plurality of associations of GPS coordinates and serving cell site identities and the plurality of associations of GPS coordinates and WiFi SSIDs received from the server computer in the non-transitory memory. In requesting the associations of GPS coordinates with serving cell identities and associations of GPS coordinates with WiFi SSIDs, the self-locating application 120 may designate an area when invoking the API of the location sharing application 132 executing on the server computer 130, whereby the associations of GPS coordinates are limited to associations of GPS coordinates located within the designated area. In an embodiment, the method 200 further comprises the self-locating application 120 transmitting an association of GPS coordinates and a service cell site identity to the location sharing application 132 and the server computer 130. In an embodiment, the method 200 further comprises the self-locating application 120 transmitting an association of GPS coordinates and SSIDs to the location sharing application 132 and the server computer 130.

Figure 3:
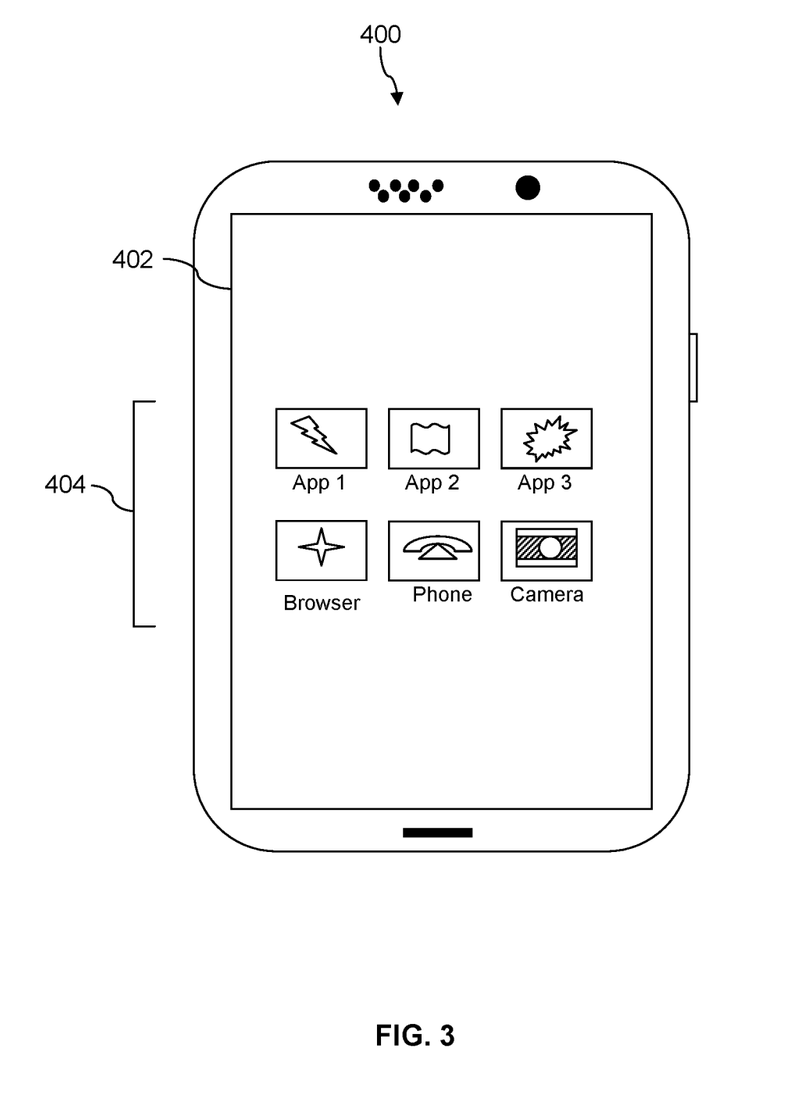
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
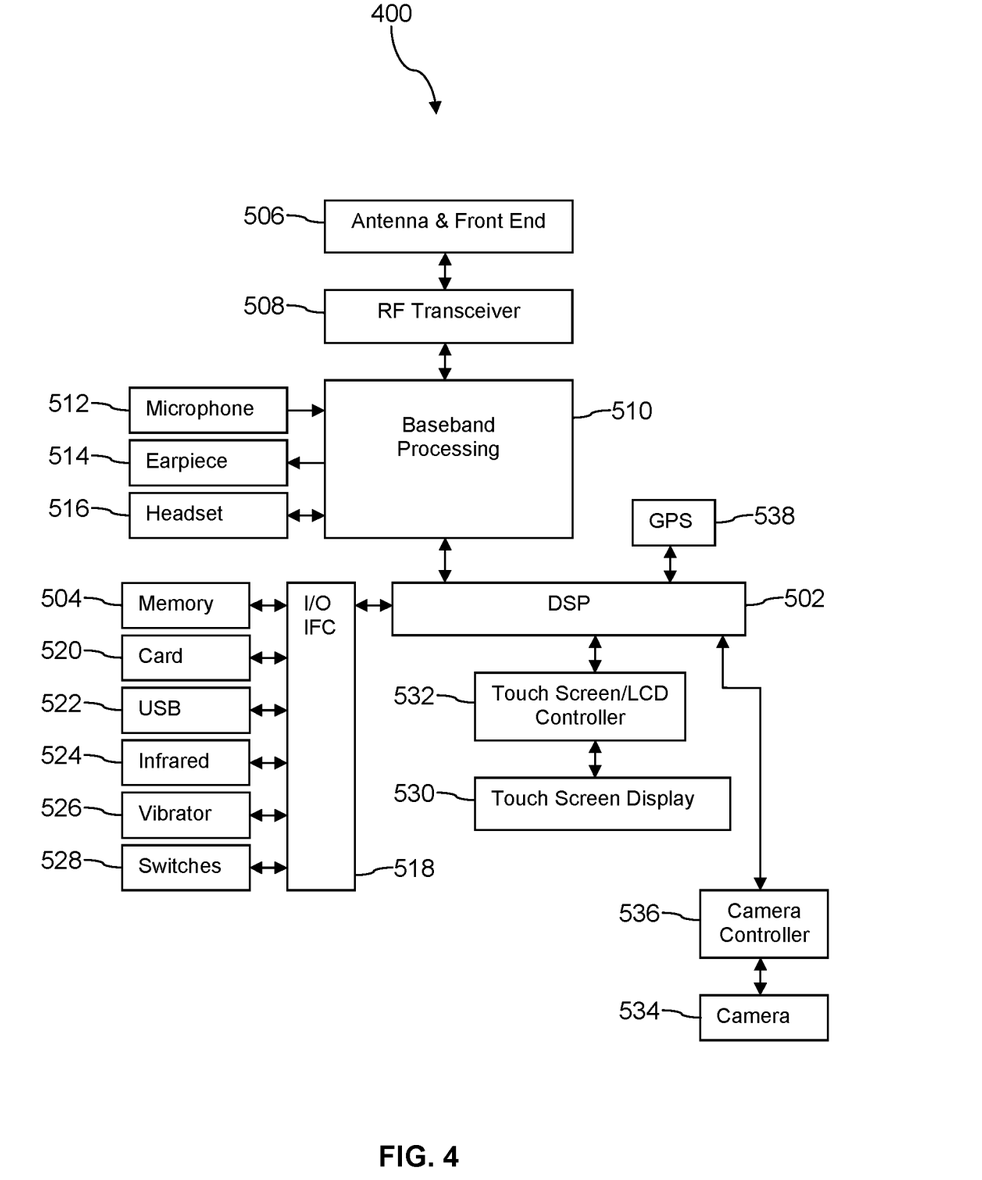
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
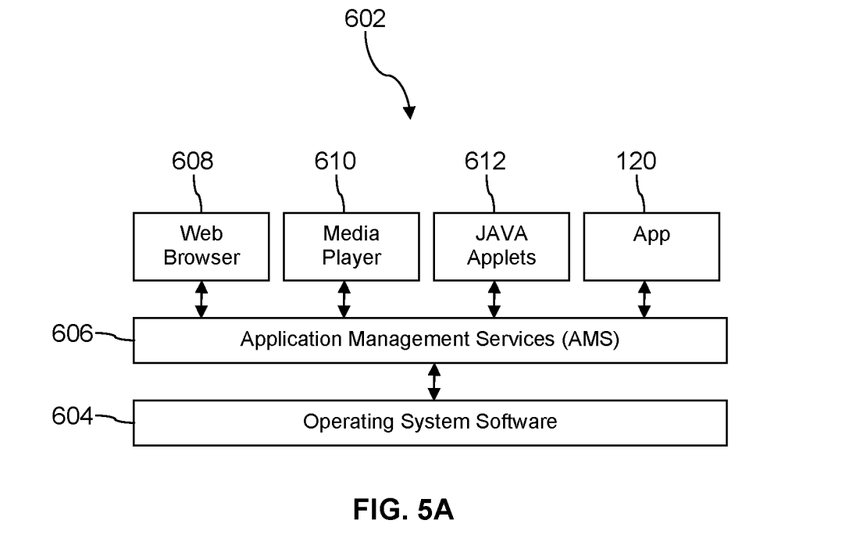
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
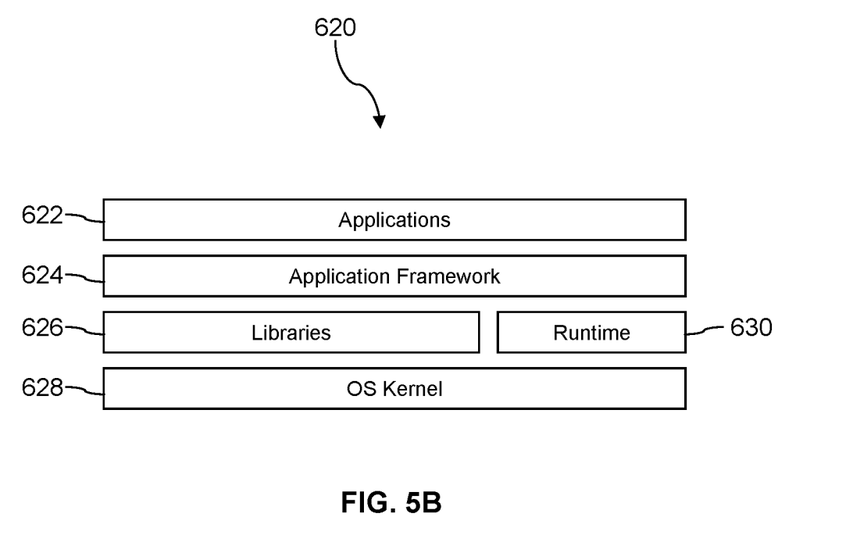
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
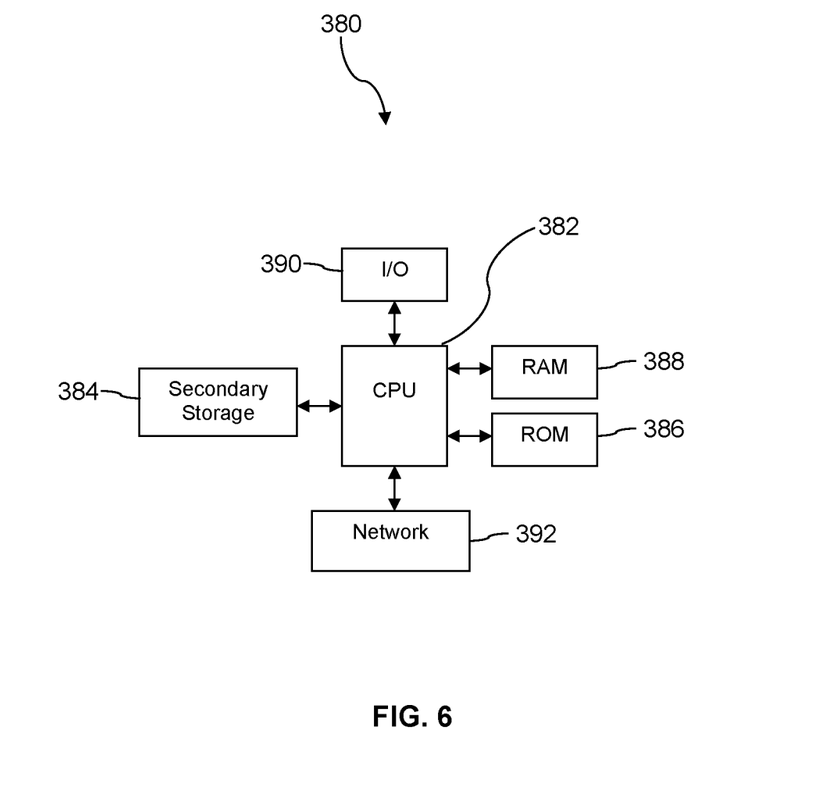
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a WiFi radio transceiver;
   a global positioning system (GPS) receiver;
   a processor;
   a non-transitory memory; and
   a self-locating application stored in the non-transitory memory that, when executed by the processor:
   monitors a plurality of WiFi service set identifiers (SSIDs) received by the WiFi radio transceiver as a group of WiFi SSIDs,
   in response to detecting disappearance of the group of WiFi SSIDs, obtains a latitude-longitude coordinate pair representing a location of the mobile communication device from the GPS receiver,
   stores the latitude-longitude coordinate pair with the group of WiFi SSIDs in the non-transitory memory,
   in response to detecting reappearance of the group of WiFi SSIDs, determines that the mobile communication device is at the location associated with the latitude-longitude coordinate pair stored in the non-transitory memory in association with the group of WiFi SSIDs,
   requests associations of latitude-longitude coordinate pairs and groups of SSIDs from a server computer using an application programming interface (API) of the server computer, wherein the self-locating application designates an area when requesting associations of GPS coordinates using the API of the server computer, receives a plurality of associations of latitude-longitude coordinate pairs and groups of SSIDs within the designated area from the server computer, stores the plurality of associations of latitude-longitude coordinate pairs and groups of SSIDs received from the server computer in the non-transitory memory, and in response to detecting appearance of one of the groups of SSIDs received from the server computer, determines that the mobile communication device is at a different location associated with a corresponding latitude-longitude coordinate pair stored in the non-transitory memory in association with the one of the groups of SSIDs received from the server computer.

2. The mobile communication device of claim 1, wherein the mobile communication device is one of a mobile phone, a smart phone, a personal digital assistant (PDA), a wearable computer, a headset computer, a laptop computer, a tablet computer, or a notebook computer.

3. The mobile communication device of claim 1, wherein the self-locating application further transmits an association of the latitude-longitude coordinate pair and the group of the WiFi SSIDs to a server computer.

4. The mobile communication device of claim 1, wherein monitoring WiFi SSIDs received by the WiFi radio transceiver comprises periodically determining the available WiFi SSIDs by the self-locating application about once every five seconds, about once every ten seconds, or about once every 15 seconds.

5. The mobile communication device of claim 1, wherein the mobile communication device presents a previously stored notification based on determining that the mobile communication device is at the location, where the previously stored notification is linked with the location.

6. The mobile communication device of claim 1, wherein the self-locating application further launches a mobile application on the mobile communication device based on determining that the mobile communication device is at the location.

7. The mobile communication device of claim 1, wherein the self-locating application further develops a confidence score for an association of the latitude-longitude coordinate pair and the group of WiFi SSIDs.

8. The mobile communication device of claim 7, wherein the self-locating application further transmits the association of the latitude-longitude coordinate pair and the group of WiFi SSIDs to a server computer in response to the confidence score exceeding a predefined threshold.

9. A mobile communication device self-locating method, each step of the method being performed a self-locating application stored in a non-transitory memory of a mobile communication device and executed by a processor of the mobile communication device;

monitoring a plurality of WiFi service set identifiers (SSIDs) received by the WiFi radio transceiver as a group of WiFi SSIDs;

in response to detecting disappearance of the group of WiFi SSIDs, obtaining a latitude-longitude coordinate pair representing a location of the mobile communication device from the GPS receiver;

storing the latitude-longitude coordinate pair with the group of WiFi SSIDs in the non-transitory memory;

in response to detecting reappearance of the group of WiFi SSIDs, determining that the mobile communication device is at the location associated with the latitude-longitude coordinate pair stored in the non-transitory memory in association with the group of WiFi SSIDs;

requesting associations of latitude-longitude coordinate pairs and groups of SSIDs from a server computer using an application programming interface (API) of the server computer, wherein the self-locating application designates an area when requesting associations of GPS coordinates using the API of the server computer;

receiving a plurality of associations of latitude-longitude coordinate pairs and groups of SSIDs within the designated area from the server computer;

storing the plurality of associations of latitude-longitude coordinate pairs and groups of SSIDs received from the server computer in the non-transitory memory; and in response to detecting appearance of one of the groups of SSIDs received from the server computer, determining that the mobile communication device is at a different location associated with a corresponding latitude-longitude coordinate pair stored in the non-transitory memory in association with the one of the groups of SSIDs received from the server computer.

10. The method of claim 9, wherein the mobile communication device is one of a mobile phone, a smart phone, a personal digital assistant (PDA), a wearable computer, a headset computer, a laptop computer, a tablet computer, or a notebook computer.

11. The method of claim 9, further comprising transmitting an association of the latitude-longitude coordinate pair and the group of WiFi SSIDs to a server computer.

12. The method of claim 9, wherein monitoring WiFi SSIDs received by the WiFi radio transceiver comprises periodically determining the available WiFi SSIDs by the self-locating application about once every five seconds, about once every ten seconds, or about once every 15 seconds.

13. The method of claim 9, wherein the mobile communication device presents a previously stored notification based on determining that the mobile communication device is at the location, where the previously stored notification is linked with the location.

14. The method of claim 9, further comprising launching a mobile application on the mobile communication device based on determining that the mobile communication device is at the location.

15. The method of claim 9, further comprising developing a confidence score for an association of the latitude-longitude coordinate pair and the group of WiFi SSIDs.

16. The method of claim 15, further comprising transmitting the association of the latitude-longitude coordinate pair and the group of WiFi SSIDs to a server computer in response to the confidence score exceeding a predefined threshold.

* * * * *